Figure 1:
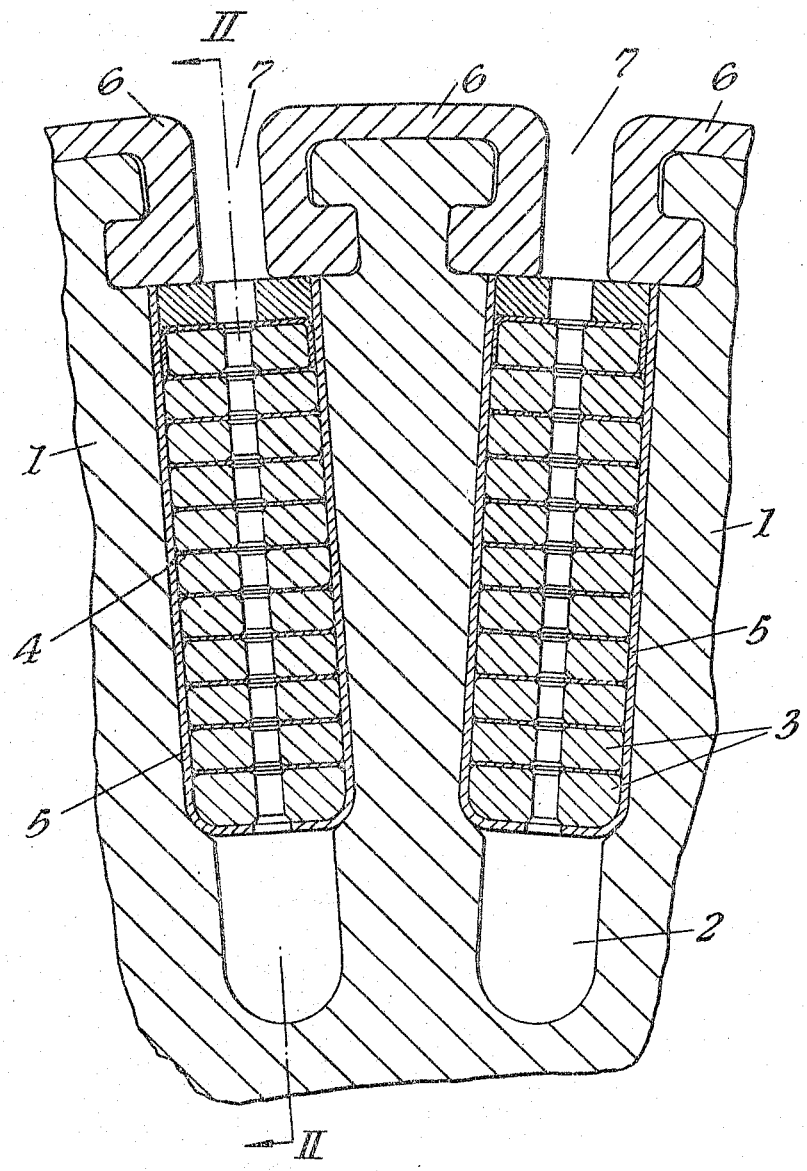

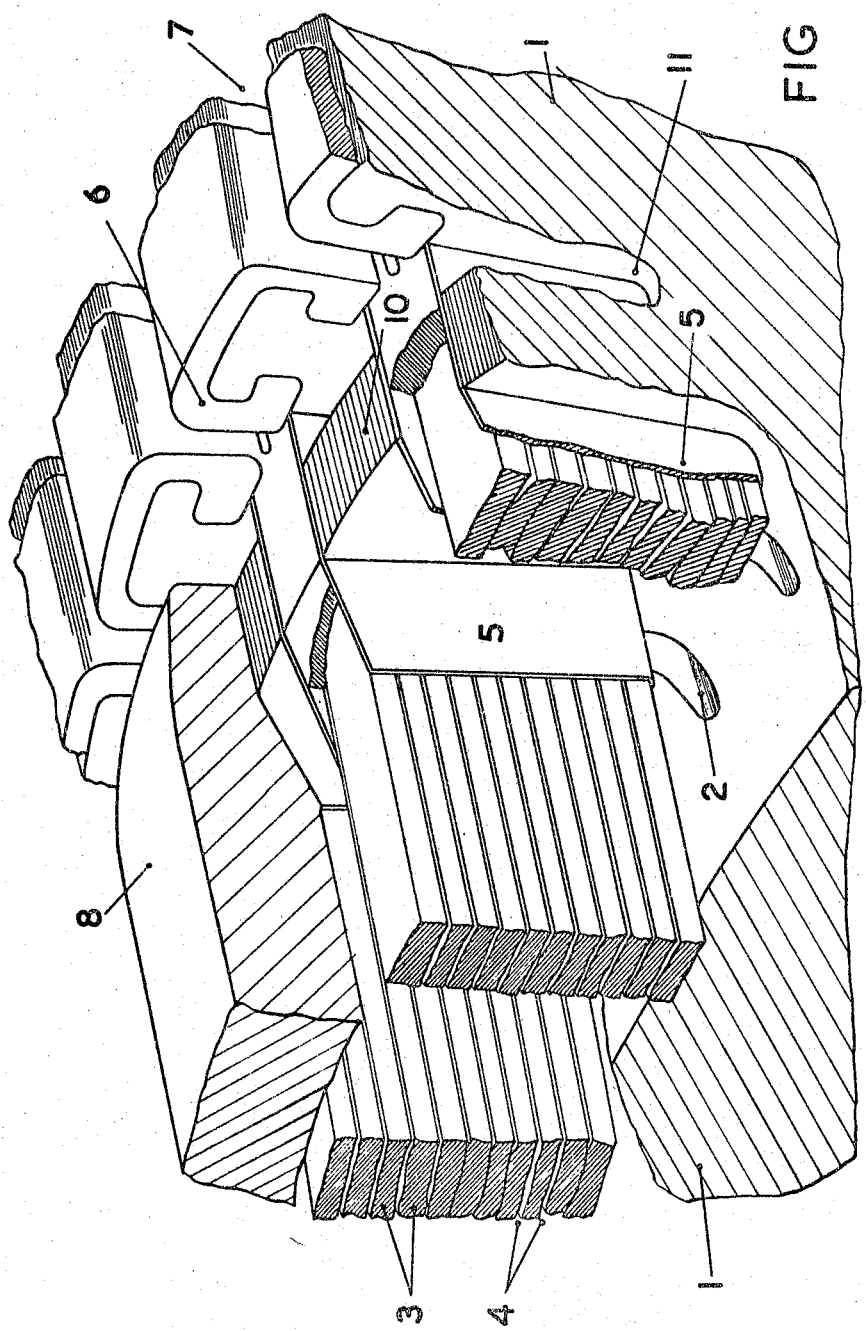

United States Patent Office 3,324,324
Patented June 6, 1967

3,324,324
DYNAMO-ELECTRIC MACHINES OF THE
SYNCHRONOUS TYPE
Philip Richardson and Norman Young, both of Newcastle-upon-Tyne, England, assignors to C. A. Parsons Company Limited, Newcastle-upon-Tyne, England, a British company
Filed May 23, 1966, Ser. No. 552,091
Claims priority, application Great Britain, July 27, 1962, 28,907/62
3 Claims. (Cl. 310—214)

This invention for the protection of which this application is made, being a continuation-in-part of Richardson and Young No. 291,436 now abandoned which was filed on June 28, 1963, relates to dynamo-electric machines of the synchronous type and is applicable to synchronous alternating current generators, synchronous condensers and synchronous motors.

It is customary in such machines to embed the rotor winding in longitudinal slots formed in the rotor body and to retain the winding in position in the slots against the action of centrifugal forces by metal slot wedges. Retaining means are also provided for the parts of the rotor winding which extend beyond the slots at each end thereof, that is to say the end windings.

In some situations for example in power stations synchronous condensers are used for power factor correction and the condensers may be provided as separate machines in a power station or at least one alternating current generator in the station may be adapted so that it can be uncoupled from its prime mover, usually a steam turbine, and be connected to an electrical supply system for use as a synchronous condenser.

When a synchronous condenser or motor is started by direct switching on to an electrical supply system at reduced voltage and full frequency, damage may be caused due to heating of the slot wedges and the retaining means for the end windings. Such heating is produced by eddy currents.

Unbalanced loads on alternating current generators, synchronous condensers or synchronous motors can also produce eddy currents resulting in undesirable heating of the slot wedges and end winding retaining means.

The principal object of the present invention is to provide a dynamo-electric machine of the kind referred to in the first paragraph of this specification in which the above-mentioned effects of eddy currents are substantially reduced or overcome.

This invention which is more particularly defined in the claims appended hereto in brief consists in a dynamo-electric machine of the synchronous type comprising a rotor, slots in said rotor extending in a direction substantially parallel to the axis of the rotor, electrical conductors forming a rotor winding located in said slots, and extending axially beyond said slots at each end thereof, to form rotor end windings, metal retaining means for securing the conductors in the slots, and separate metal retaining means for securing the end windings against the effects of centrigual forces, said metal retaining means for securing the end windings being in the form of tubular members fitting over the windings, there being a member at each end of the rotor, said metal retaining means for the conductors comprising channel shaped members adapted to slide over rotor teeth between conductor slots, each said channel member extending over a portion of each of the pair of slots on either side of the rotor tooth supporting said member, but being spaced from the channel members on adjacent teeth so as to define a gas space extending for the full axial length of the slot, the retaining means for securing the end windings being separated from the retaining means for the slot embedded conductors by electrically insulating barrier means perpendicular to the rotor axis.

Figure 2:
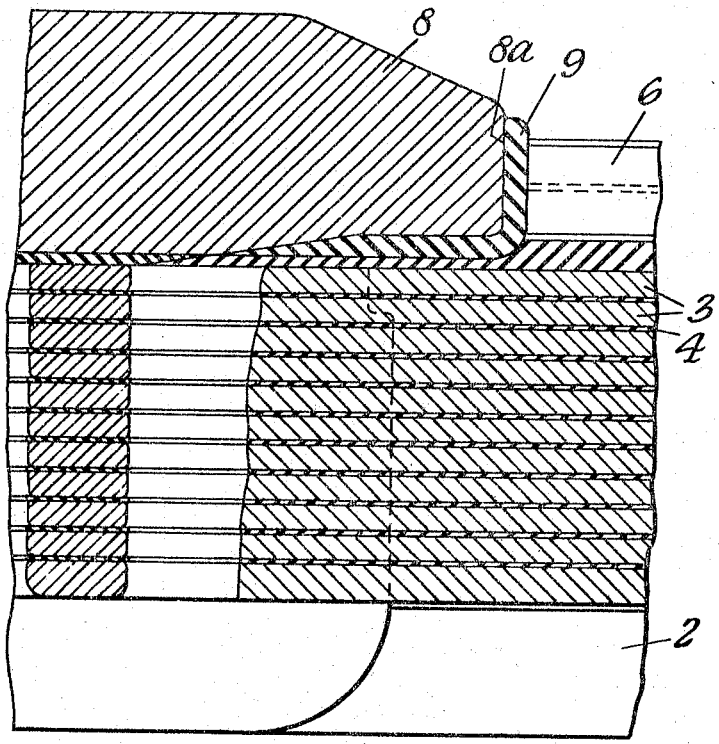
Figure 3:
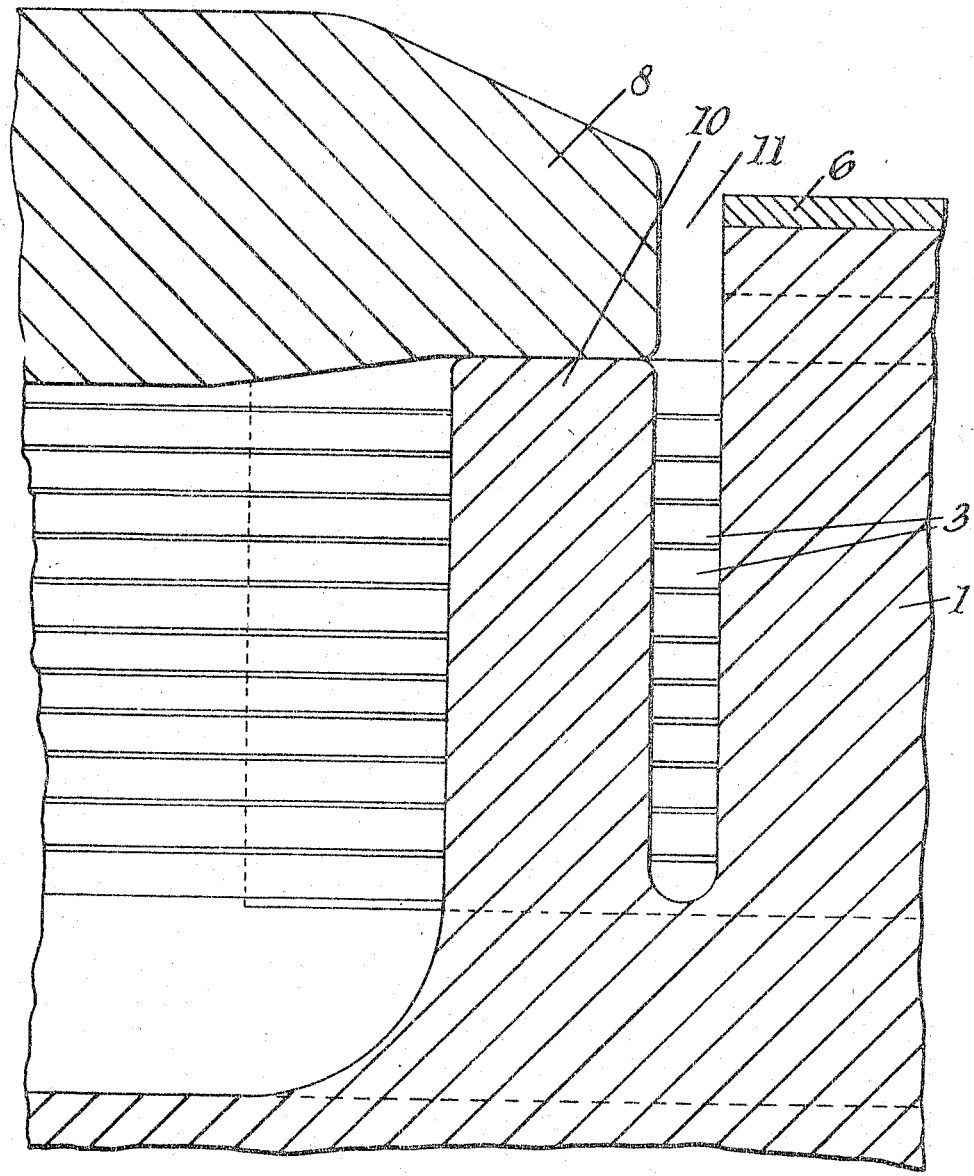

Referring to the accompanying drawings:
FIGURE 1 is a sectional view taken through two adjacent slots of a rotor showing slot wedges in accordance with the invention;
FIGURE 2 is a cross-sectional view taken along line II—II of FIGURE 1 illustrating insulating barrier means between an end winding retaining means and the slot wedges in accordance with one embodiment of the invention;
FIGURE 3 is a view generally similar to FIGURE 2 illustrating insulating barrier means between end winding retaining means and the slot wedges in accordance with another embodiment of the invention and,
FIGURE 4 is a fragmentary and perspective view further illustrating the embodiment shown in FIGURE 3.

In carrying the invention into effect in the forms illustrated by way of example and referring first to FIGURE 1, the rotor body 1 of a synchronous alternating current generator or a synchronous condenser or motor has a number of slots 2. These slots extend in an axial direction and house the rotor winding which is made up of conductors 3. The conductors 3 are insulated from one another by insulation 4 and from the sides of the slot by insulation 5.

The windings are retained in their slots in the rotor by slot wedges in the form of members 6 which are secured to the rotor body at each side of a slot and serve to retain the windings in the slot. A gap 7 which is continuous in the axial direction is provided between adjacent members 6 so that no flow path for eddy currents exists across any slot except at the inner end of the slot.

In effect the rotor teeth are effectively insulated from one another by the insulation 5 and the gaps 7.

The members 6 may each be associated with one slot only but it is convenient to make them in the form shown so that they serve two adjacent slots.

In FIGURE 2 the portions of the rotor winding which are embedded in the rotor slots and extend beyond the rotor slots at each end thereof, namely the end windings, are enclosed and retained in position against centrifugal force by end winding retaining means in the form of a ring 8.

It is customary for the axially inward facing end 8a of the ring 8 to abut the slot wedge 6 and, as this is of metal, a path for eddy current flow is provided from the rotor through the slot wedges and into the end ring. In the arrangement of FIGURE 2, insulation 9 is provided between face 8a of ring 8 and the rotor body including the ends of the wedges 6, to act as a barrier to eddy current flow.

FIGURES 3 and 4 illustrate an alternative arrangement for preventing or reducing the flow of eddy currents into the end ring 8. In this arrangement a collar 10 is formed on the rotor body and is spaced in the axial direction from the rest of the rotor body by a gap 11. The ring 8 abuts and is in contact with the collar 10 but the gap 11 acts as a barrier to the eddy current flow into the end ring. Eddy current flow can take place in the region of the radially inward end of the gap 11 but any heat generated in this region is readily dissipated in the large metal mass of the rotor body.

This invention is not to be confined to a strict conformity of the showings in the drawings but changes or modifications may be made therein so long as such changes or modifications mark no material departure from the spirit and scope of the appended claims.

We claim:
1. A dynamo-electric machine of the synchronous type comprising a rotor, slots in said rotor extending in a direction substantially parallel to the axis of the rotor, electrical conductors forming a rotor winding located in said slots, and extending axially beyond said slots at each end thereof, to form rotor end windings, metal retaining means for securing the conductors in the slots, and separate metal retaining means for securing the end windings against the effects of centrigual forces, said metal retaining means for securing the end windings being in the form of tubular members fitting over the windings, there being a member at each end of the rotor, said metal retaining means for the conductors comprising channel shaped members adapted to slide over rotor teeth between conductor slots, each said channel member extending over a portion of each of the pair of slots on either side of the rotor tooth supporting said member, but being spaced from the channel members on adjacent teeth so as to define a gas space extending for the full axial length of the slot, the retaining means for securing the end windings being separated from the retaining means for the slot embedded conductors by electrically insulating barrier means.

2. A dynamo-electric machine as claimed in claim 1, in which the retaining means for securing the end windings are separated from the retaining means for the slot embedded conductors by electrically insulating barrier means in the form of solid electrical insulation.

3. A dynamo-electric machine as claimed in claim 1, in which the retaining means for securing the end windings are separated from the retaining means for the slot embedded conductors by electrically insulating barrier means in the form of a gap lying in a plane perpendicular to the rotor axis.

No references cited.

MILTON O. HIRSHFIELD, *Primary Examiner.*

J. J. SWARTZ, *Assistant Examiner.*